United States Patent [19]

Ginnings et al.

[11] 4,452,962

[45] Jun. 5, 1984

[54] ACCELERATED CONDITIONING OF SILICONE-MODIFIED POLYESTER FILM TO YIELD IMMEDIATE HIGH SLIP PROPERTIES

[75] Inventors: Paul R. Ginnings, Wadsworth; Jack E. Prince, North Canton, both of Ohio

[73] Assignee: The Goodyear Tire & Rubber Company, Akron, Ohio

[21] Appl. No.: 472,515

[22] Filed: Mar. 7, 1983

[51] Int. Cl.$^3$ ............................................. C08G 77/04
[52] U.S. Cl. ........................................ 528/26; 528/27; 528/29; 528/274; 525/474
[58] Field of Search ...................... 528/26, 27, 29, 274; 525/474

[56] References Cited

U.S. PATENT DOCUMENTS

| | | | |
|---|---|---|---|
| 2,628,215 | 2/1953 | Hunter et al. | 525/474 |
| 3,044,979 | 7/1962 | Saville | 525/474 |
| 4,348,510 | 9/1982 | Keck et al. | 525/474 |

Primary Examiner—Melvyn I. Marquis
Attorney, Agent, or Firm—Alvin T. Rockhill

[57] ABSTRACT

The invention provides for a process for inducing immediate high slip properties in a silicone modified, unorientated polyester. The process comprises heating the polyester film, article, etc., in a fluid at a temperature of from about 70° C. to about 200° C.

20 Claims, No Drawings

ACCELERATED CONDITIONING OF SILICONE-MODIFIED POLYESTER FILM TO YIELD IMMEDIATE HIGH SLIP PROPERTIES

TECHNICAL FIELD

The invention herein lies in the art of high slip polyesters. Specifically, the invention relates to a method for producing polyester films having immediate high slip properties after being formed, thus eliminating the need for a lengthy or time-consuming post-formation treatment step.

BACKGROUND ART

It has heretofore been known to produce polyesters and copolymers having high slip, this property being defined as the lack of affinity between two polyester surfaces when in contact with each other.

Two approaches have been used to produce polyesters having high slip. One is to incorporate into the polymer various non-homogeneous substances having low coefficients of friction, such as clays, silicon dioxide, etc. Another is to incorporate into the molecular chain a substance which imparts the non-slip characteristic to the polyester. This latter approach is the subject of U.S. Pat. No. 4,348,510, granted Sept. 7, 1982. In this application, the use of various polysiloxanes is disclosed.

The use of clays and other non-homogeneous substances have been found wanting in that they affect clarity of the polyester, have poor dispersion characteristics, and that they would show up on X-ray film.

Similarly, the use of various polysiloxanes to achieve high slip, while allowing high clarity and being incorporated into the polyester, has heretofore required a conditioning step to produce the desired effect. This involved the procedure outlined in ASTM test method D-1894 calling for the polyester film to be maintained in an inert atmosphere at 75° F. and 55 percent relative humidity for at least 40 hours. Without this conditioning step, the silicone modified polyester would not possess high slip properties. On a large production basis, this process would become highly undesirable as it would entail great expenditure in large amounts of treating equipment.

U.S. Pat. No. 4,310,600 to Cross discloses the use of a silicon coating on a biaxially oriented polyester film. There is no teaching or suggestion in this patent or in the prior art of a process for producing immediate high slip polyester film.

DISCLOSURE OF INVENTION

It is therefore an aspect of this invention to provide a process for making a high slip polyester utilizing polysiloxanes.

It is another aspect of the invention to provide a process, as above, which does not require a prolonged conditioning period to activate the high slip property.

It is a further aspect of the invention to provide a process, as above, which eliminates the need for a large inventory of stored polyester in the conditioning apparatus.

It is yet another aspect of the invention to provide a process, as above, which is economical and which can be carried out and completed immediately after manufacture of the polyester.

It is yet another aspect of the invention to provide a process, as above, wherein said high slip properties are immediately imparted to said article by heating said article to a temperature of at least 72° C., and wherein said polyester is unorientated.

These aspects and others which will become more apparent as the detailed description proceeds are achieved by: a method for imparting high slip properties to a silicone modified unorientated polyester, comprising the steps of: heating the silicone modified polyester at a temperature of from about 70° C. to about 200° C. so that a low static coefficient of friction is imparted thereto, said silicone modified polyester having from about 0.5 to about 10 weight percent of a silicone repeating structure therein.

In general, a method for imparting high slip properties to a silicone modified polyester, comprising:
making said silicone modified polymer by reaction of a mixture of reactants comprising:
 (a) at least one reactant selected from the group consisting of
  (1) aromatic dicarboxylic acids having from 8 to 15 carbon atoms or $C_1$ to $C_4$ dialkyl esters thereof, and
  (2) aliphatic dicarboxylic acids having from 4 to 15 carbon atoms or the $C_1$ to $C_4$ dialkyl esters thereof wherein the reactant selected from group (1) constitutes reactant (a) and the reactant selected from the group (2) constitutes from 0 to 50 mole percent of the total moles of reactant (a);
 (b) from about 100 to about 300 mole percent, based on the total moles of reactant (a) of at least one reactant selected from the group consisting of alkylene glycols containing from 2 to 10 carbon atoms; and
 (c) from about 0.5 to about 10 weight percent based on the weight of the polymeric reaction product, of a dihydroxy terminated polydimethylsiloxane block copolymer of the general formula

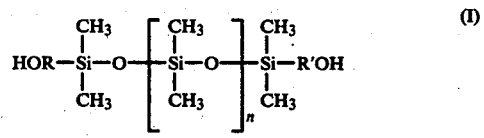

where n is an integer ranging from about 8 to about 15 and R and R' are divalent polymethylene oxide radicals corresponding to the general formula:

and

respectively, wherein x is an integer ranging from about 2 to about 8 and y is an integer ranging from about 8 to 15 and wherein dihydroxy terminated polymethylsiloxane block copolymer has a molecular weight ranging from about 1,600 to 5,500; and heating said silicone modified polyester at a temperature of from about 70° C. to about 200° C. to achieve said high slip.

In general, a high slip silicone modified, unorientated polyester article, comprising: a polyester having from about 0.5 to about 10 weight percent of a silicone compound, said polyester article having been heated at a temperature of from about 70° C. to about 200° C. whereby said high slip is immediately imparted to said silicone article.

BEST MODE FOR CARRYING OUT THE INVENTION

The present invention provides a process for producing unorientated silicone modified polyesters having immediate high slip, that is, the polyester surface has little or no affinity for itself immediately or within a short period of time after processing. The conditioning process of this invention imparts immediately high slip properties by heating the article, film, etc. to a temperature of from about 70° to about 200° C., desirably from about 75° C. to about 105° C., and preferably from about 80° C. to about 100° C. The time will vary with the temperature but is usually less than a few minutes, such as from about a second or two to about two minutes, with from about 10 seconds to a minute being preferred. The fluid may be any fluid which is inert to the polyester and does not affect its ability to achieve a high slip coating. Preferably, it is air or inert gas, (e.g. nitrogen) or water. Prior to immersion conditioning, all processing is usually completed so that the polyester is in the final form. Processing usually takes place immediately after forming, that is, within 5 or 10 minutes, and often times within a minute or two.

The types of polyesters which may be utilized in the invention include random, linear thermoplastic block copolyesters, as set forth in U.S. Pat. No. 4,348,510, hereby fully incorporated by reference. The polyesters are the reaction products of (a) at least one reactant selected from the group consisting of (1) aromatic dicarboxylic acids having from 8 to 15 carbon atoms or the $C_1$ to $C_4$ dialkyl esters thereof, and (2) aliphatic dicarboxylic acids having from 4 to 15 carbon atoms, or $C_1$ to $C_4$ dialkyl esters thereof, wherein the reactant or reactants selected from Group (a)(1) constitute from 100 to 50 mole percent of the total moles of said reactant (a) and the reactant or reactants from (a)(2) constitute from 0 to 50 percent of the total moles of said reactant (a), (b) from about 100 to about 300 mole percent based on the total moles of reactant (a) in said mixture of reactants, of at least one reactant selected from the group consisting of alkylene glycols containing from 2 to 20 carbon atoms, and (c) from 0.5 to about 10 weight percent, based on the weight of said polymeric reaction product of dihydroxy terminated polydimethyl siloxane block copolymer of the general formula:

Formula I

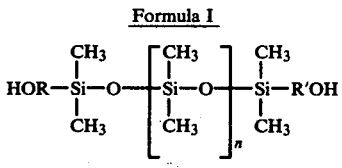

where n is an integer ranging from about 8 to about 15 and R and R' are divalent polymethylene oxide radicals corresponding to the formula:

Formula II

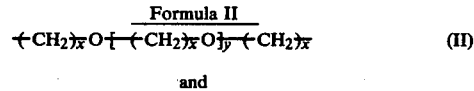

and

Formula III

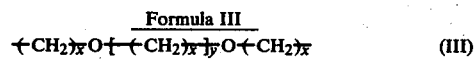

respectively, and wherein x is an integer ranging from about 2 to about 8 and y is an integer ranging from about 8 to 15 to provide said block copolymer with a molecular weight ranging from about 1,600 to 5,500.

In a preferred embodiment, the invention provides for random, linear thermoplastic block copolyesters consisting of the polymeric reaction product of the mixture of reactants (a), (b), and (c) defined hereinabove, wherein reactant (a) is selected from said (a)(1) reactants consisting of aromatic dicarboxylic acids or the C to $C_4$ dialkyl esters thereof, reactant (b) is selected from alkylene glycols containing from 2 to 6 carbon atoms and reactant (c) is a dihydroxy terminated polydimethylsiloxane block copolymer as defined in the general Formula I set forth above, wherein the integer n ranges from about 10 to about 13 and wherein the integers x and y of the divalent radical R and R' set forth in Formulas II and III hereinabove range from about 2 to about 4 and from about 10 to about 13, respectively. In a more preferred embodiment, the invention provides for random, linear thermoplastic block copolyesters consisting of the polymeric reaction product of the mixture of reactants (a), (b), and (c) wherein reactant (a) is selected from the group consisting of terephthalic acid or its dialkyl ester, dimethylterephthalate, wherein reactant (b) ranges from about 100 to about 250 mole percent based on the total moles of reactant (a) and is ethylene glycol, and wherein reactant (c) is a dihydroxy terminated polydimethylsiloxane block copolymer of the general Formula I above, wherein the integer n ranges from about 10 to about 13, the integer x of the divalent radicals R and R' as depicted in Formulas II and III above is 2 and the integer y therein ranges from about 10 to about 13 to provide a dihydroxy terminated polydimethylsiloxane block copolymer having a molecular weight ranging from about 1,900 to about 2,400, and wherein (c) is present in said mixture of reactants (a), (b), and (c) in an amount ranging from about 0.5 to about 6.5 and preferably from about 2.0 to about 6.0 weight percent based on the weight of the polymeric reaction product.

Representative examples of acids other than the preferred terephthalic acid include the aromatic dicarboxylic acids, e.g., isophthalic acid, 1,5-naphthalene dicarboxylic acid, 2,6-naphthalene dicarboxylic acid, 4,4'-diphenyl dicarboxylic acid, and the like, or esters thereof such as dimethylterephthalate. Representative examples of aliphatic dicarboxylic acids or the $C_1$ to $C_4$ dialkyl esters thereof which can be used in combination with the aromatic dicarboxylic acids or the dialkyl esters include dodecanedioic acid, acelaic acid, pimelic acid, and sebacic acid. Representative examples of other glycols besides ethylene glycol which can be employed to prepare the copolyesters include diethylene glycol, propylene glycol, 1,8-octane diol, decamethylene glycol, and the like, branch chain glycols such as neopentyl glycol, 2-methyl-2-ethyl propane diol-1,3- and 2,2-diethyl propane diol-1,3 and cycloalkane diols such as cyclohexane dimethanol. Of the block copolyesters described herein, those prepared from terephthalic acid or its dimethyl ester, ethylene glycol, and Dow Corning's Q4-3667 (hereinafter described) are most preferred.

The block copolyesters are prepared by conventional processes and techniques employed in the production of polyesters. In accordance therewith, the block copolyesters are prepared by first subjecting the mixture of reactants from which they are derived to either transesterification or esterification reaction conditions followed by subsequent polycondensation of either the transesterification or esterification reaction product. In general, the transesterification reaction, involving reaction between a dialkyl ester of a dicarboxylic acid and glycol will be conducted at elevated temperatures ranging from about 170° C. to about 205° C. and preferably from about 185° C. to about 200° C. under an inert gas atmosphere such as nitrogen. In addition, a catalyst will usually be employed to promote the transesterification reaction such as soluble lead and titanium compounds, representatives of which include litharge, lead acetate, glycol titanates, and the like, as well as other well known transesterification catalysts such as compounds of zinc, magnesium, calcium and manganese. In many instances, the soluble lead and titanium compounds may be preferred since these catalysts are also known to promote the formation of highly polymeric products in the subsequent polycondensation stage.

The esterification reaction involving the reaction between a free dicarboxylic acid and a glycol with the evolution of water also is carried out at elevated temperatures and, in addition, at elevated pressures employing inert gas atmospheres. Usually, the reaction temperatures will range from about 220° C. to about 270° C. and pressures from about 30 to about 40 pounds per square inch (2.0–3.0 kilograms per square centimeter). The reaction can be carried out either in the presence or absence of catalysts. When catalysts are employed, those normally indicated in the art as being useful include compounds of metals such as zinc, lead, antimony, manganese, zirconium, and the like. The reaction can also be carried out in the presence of low molecular weight polymeric solvent such as described in U.S. Pat. No. 4,020,049, the teachings of which are incorporated herein by reference.

The polycondensation reaction, the final preparation step in the production of the block copolyesters of the present invention, is also carried out employing well known techniques and conditions. Thus, in the polycondensation step, elevated temperatures, reduced pressures and inert atmospheres are utilized during the polymerization of the transesterification or esterification reaction product to the desired final product. Temperatures employed in this reaction step will generally range from about 260° C. to about 300° C. and preferably from about 270° C. to about 285° C. while pressures will range from about 1.0 to 0.1 millimeters of mercury pressure. Catalysts useful in promoting the polycondensation include, in addition to the soluble lead and titanium catalysts noted above, various known compounds of antimony, niobium pentoxide, germanium dioxide, and the like. Normally, these catalysts will be added to the transesterification or esterification reaction product when the formation of said product is fairly complete and before the polycondensation step is begun.

As noted, the amount of siloxane block copolymers by weight in the unorientated polymer ranges from about 0.5 to about 10 weight percent based upon the total weight of said polyester polymer. A desirable amount ranges from about 0.5 to about 6.5 percent, with from about 2 percent to about 6 percent being preferred. It is noted that the upper loading amount is generally limited by the fact that if high amounts of siloxane block polymer are utilized, haze is imparted to the polyester article or film.

The static coefficient of friction achieved by the immediate high slip process of the present invention is generally below 1.0, desirably 0.5 or less, and preferably about 0.4 or less. The coefficient of friction can be measured by ASTM Test D-1894-78. It has generally been found that this test can be closely correlated by a much simpler test utilizing the following equipment: (1) Zebco De-Liar Model 228 Fish Scale with replacement spring for increments of 50 grams. Total scale length equals 1,200 grams. (2) One, eight-inch long nonextensible cord. (3) One, 96 gram weight, 1 1/16 inches in diameter and 1⅜ inches in height. (Any weight 100±5 grams will do. (4) One, small laboratory hose C clamp (weight 28 grams). (5) One, Preco Press with 12×12 inch platens.

The test procedure is then conducted in the following manner:

a. Place two test specimens together with at least 1¼ inches of the strip on top in contact with the strip underneath.
b. Set the cylindrical 96 gram weight on top of both layers of sheeting.
c. Attach the hose clamp securely to the top strip of sheeting.
d. Attach the cord to the other end of the clamp. Then attach the scale to the free end of the cord. (The test should be conducted with the fish scale and cord beyond the edge of the table so that the force is applied in a horizontal direction).
e. While holding the bottom strip securely with one hand or with a clamp, pull the fish scale slowly but evenly with the other hand. Record the force applied (to the nearest 10 grams) when the top strip releases from the bottom strip and begins to move.
f. A second measurement can be made from the same samples by reversing the strips, placing the bottom on top and using the opposite ends to exposure fresh test areas.
g. Make at least 3 determinations.

Generally, when the results obtained by the above quick test is divided by one hundred, a good correlation will exist with regard to the static coefficient of friction obtained by the ASTM test noted above.

The following examples illustrate both the preparation of the silicone modified polyesters and the process for producing immediate high slip properties. The dihydroxy terminated polydimethylsiloxane block copolymer used in preparing the block copolyesters in the examples below was Dow Corning's Q-43667 and is identified in the examples as "silicone diol". This commercially available ABA type block copolymer is characterized by Dow Corning as a liquid silicone polycarbinol having a molecular weight of approximately 2,400, a viscosity of 320 centipoise, a flash point of 140.5° C., a refractive index of 1.44 and a pour point of 18.3° C. All mole percentages are based on the total number of moles of the free dicarboxylic acids and/or lower dialkyl esters of dicarboxylic acids present in the reaction mixture. All weight percentages are based on the total weight of the polymeric reaction product, i.e., the block copolyesters constituting the present invention, resulting from reaction of the mixture of reactants (a), (b), and (c) defined herein. Intrinsic viscosity (I.V.) were determined employing a 60/40 phenol/tetrachloroethane mixed solvent system and measured in a No. 1 Ubbelohde viscometer at 30° C. using concentrations of 0.4 gram of sample per 100 cubic centimeters of mixed solvent. Film samples were conditioned as set forth below. Haze values were tested in accordance with ASTM test D-1003.

EXAMPLE 1

Employing the general process as described in U.S. Pat. No. 4,020,049 there was prepared a random, linear thermoplastic block copolymer of the present invention as follows:

To a 9.5 gallon (36.0 liter) capacity stainless steel reactor equipped with a stirrer and distillation column there were added 20.81 pounds (9.44 kilograms) of terephthalic acid (TPA) and 9.32 (4.23 kilograms) of ethylene glycol (EG). The reactor was pressurized to 35 pounds per square inch (241.32 kPa) pressure and the mixture therein heated, with continuous stirring, to about 268° C. for 4.5 hours. At the end of this time 1140 grams of by-product water had been distilled from the reactor. Heating and stirring of the reaction mixture (low molecular weight polymer) were continued for an additional one hour beyond this point.

To the above reaction product which functions as a solvent for the following esterification reaction were added 17.3 pounds (7.85 kilograms) of TPA and 7.74 pounds (3.5 kilograms; 120 mole percent) of EG. This mixture was reacted for two hours at a temperature of from 255° C. to 268° C. under a pressure of 35 pounds per square inch (241.32 kPa) until 1260 grams of by-product water had been collected. At this point, a portion of the reaction mixture, equivalent to the weight of the product of the reaction of 17.3 pounds (7.85 kilograms) of TPA and 7.74 pounds (3.5 kilograms) of EG or approximately 20.1 pounds (1.1 kilograms) was transferred to a 10.4 gallon (39.4 liters) capacity stainless steel polymerization vessel equipped with a stirrer, distillation column and vacuum line. To the reaction mixture in this polymerization vessel was then added 204 grams (2.25 weight percent) of the silicone diol and 168.6 grams of an ethylene glycol solution containing 11.0 grams of antimony trioxide ($Sb_2O_3$) per 1000 grams of ethylene glycol as catalyst. Over the next 65 minutes the temperature of the reaction mixture was increased from 258° C. to 272° C. and the pressure in the polymerization vessel decreased from atmospheric pressure to 1.0 millimeter of mercury pressure (0.133 kPa). The reaction mixture was then heated an additional 30 minutes at 269° C. to 277° C. and a pressure of 0.20 millimeter of mercury (0.026 kPa). At the end of this time, the copolyester product was discharged from the reactor and determined to have an I.V. of 0.507.

In a manner exactly identical to Example 1, the polyester was prepared except that no silicone diol was added thereto. This copolyester product was the control.

EXAMPLE 2

To a 9.5 gallon (36.0 liter) capacity stainless steel reactor equipped with a stirrer and distillation column, there was added 4.71 kilograms (10.4) pounds of terephthalic acid (TPA) and 2.13 kilograms (4.7 pounds) of ethylene glycol (EG). The reactor was pressurized to 35 pounds per square inch (241.32 kPa) pressure and the mixture therein heated, with continuous stirring to about 268° C. for 4.5 hours. At the end of this time 570 milliliters of by-product water had been distilled from the reactor. Heating and stirring of the reaction mixture (low molecular weight polymer) were continued for an additional 60 minutes beyond this point.

To the above reaction product which functions as a solvent for the following esterification reaction were added 8.66 kilograms (19.1 pounds) of TPA and 3.9 kilograms (8.6 pounds) of EG. This mixture was reacted for 230 minutes at a temperature of from 213° C. to 272° C. under a pressure of 35 pounds per square inch (241.32 kPa) until 2340 milliliters of by-product water had been collected. At this point, a portion of the reaction mixture, equivalent to the weight of the product of the reaction of 8.66 kilograms (19.1 pounds) of TPA and 3.9 kilograms (8.6 pounds) was transferred to a 10.4 gallon (39.4 liters) capacity stainless steel polymerization vessel equipped with a stirrer, distillation column, and vacuum line. To the reaction mixture in this polymerization vessel were then added 159 grams (3.5 weight percent) of the silicone diol and 87 grams of an ethylene glycol solution containing 210 grams of antimony trioxide ($Sb_2O_3$) per 1000 grams of ethylene glycol as catalyst. Over the next 80 minutes, the temperature of the reaction mixture was increased from 255° C. to 267° C. and the pressure in the polymerization vessel decreased from atmospheric pressure to 1.0 millimeter of mercury pressure (0.133 kPa). The reaction mixture was then heated an additional 130 minutes at 270° C. and at a pressure of 0.4 millimeters of mercury (0.052 kPa). At the end of this time, the copolyester product was discharged from the reactor and determined to have an I.V. of 0.574.

EXAMPLES 3-7

Example 1 was repeated in all respects with the following exceptions. The amount of TPA and EG added to the low molecular weight reaction product prepared in the first step varied, the amount of $Sb_2O_3$/EG catalyst solution and the weight of silicone diol added. See Table I for the respective amounts of Examples 3-7.

TABLE I

| Example | TPA (kg) | EG (kg) | $SbO_3$/EG Solution (g) | Silicone Diol | Final I.V. of Product |
|---|---|---|---|---|---|
| 3 | 6.49 | 2.90 | 166.7 | 374.2 g (5.0 wt. %) | .498 |
| 4 | 6.49 | 2.90 | 166.7 | 449.1 g (6.0 wt. %) | .484 |
| 5 | 6.49 | 2.90 | 140.0 | 524 g (7.0 wt. %) | .467 |
| 6 | 6.49 | 2.90 | 166.7 | 598.8 g (8.0 wt. %) | .463 |
| 7 | 6.49 | 2.90 | 166.7 | 673.6 g (9.0 wt. %) | .437 |

EXAMPLE 8

To a 9.5 gallon (36.0 liter) capacity stainless steel reactor equipped with a stirrer and distillation column there was added 5.62 kilograms (12.4 pounds) of EG. The reactor was pressurized to 35 pounds per square inch (241.32 kPa) pressure and the mixture therein heated, with continuous stirring to about 268° C. for 4½ hours. During this by-product water had been distilled from the reactor. Heating and stirring of the reaction mixture (low molecular weight polymer) were continued for an additional 60 minutes beyond this point.

To the above reaction product which functions as a solvent for the following esterification reaction was added 4.72 kilograms (10.4 pounds) of TPA and 2.13 kilograms (4.7 pounds) of EG. This mixture was reacted for two hours at a temperature of from 245° C. to 272° C. under a pressure of 35 pounds per square inch (2.5 kilograms/square centimeters) until 920 milliliters of by-product water had been collected. At this point, a portion of the reaction mixture, equivalent to the weight of the product of the reaction of 4.72 kilograms (10.4 pounds) of TPA and 2.14 kilograms (4.7 pounds) of EG were transferred to a 10.4 gallon (39.4 liters) capacity stainless steel polymerization vessel equipped with a stirrer, distillation column and vacuum line. To the reaction mixture in this polymerization vessel were then added 544.3 grams (10.0 weight percent) of the silicone diol and 95.3 grams of an ethylene glycol solution containing 210 grams of antimony trioxide ($SbO_3$) per 1000 grams of ethylene glycol as catalyst. Over the next 90 minutes, the temperature of the reaction mixture was increased from 256° C. to 272° C. and the pressure in the polymerization vessel decreased from atmospheric pressure to 1.0 millimeter of mercury pressure (kPa). The reaction mixture was then heated an additional hour at a temperature of from 273° C. to 276° C. and at a pressure of from 0.6 to 0.4 millimeter of mercury (0.078 to 0.052 kPa). At the end of this time, the copolyester product was discharged from the reaction and determined to have an I.V. of 0.408.

Examples of the block copolyesters were prepared in Examples 1 through 8 and the controls were flat-die extruded into nonorientated films of nominal 10 to 12 mil thickness. The samples were then treated to impart immediate high slip properties thereto by inserting the unorientated films into boiling water for the length of time set forth in Table II. The coefficient of friction according to the above set forth tests was made on ten samples containing a specific amount of silicone by weight in the polyester and the average value thereof divided by 100 is set forth in Table II. Moreover, a haze test was also taken. The results are set forth in Table II.

TABLE II

| | Length of Treatment | | |
|---|---|---|---|
| % Silicone (Wt) | 3 secs. | 30 secs. | Haze |
| 0 (control) | 6.01 | 4.65 | 1.1 |
| 2.25 | 1.59 | .64 | 1.2 |
| 3.5 | 1.69 | .61 | — |
| 5.0 | 2.66 | .31 | 3.5 |
| 6.0 | 2.07 | .30 | 3.8 |
| 7.0 | 1.25 | .25 | 6.4 |
| 8.0 | 1.71 | .25 | 7.1 |
| 9.0 | 1.78 | .19 | 8.5 |
| 10.0 | 2.50 | .20 | 9.4 |

As apparent from Table II, immediate high slip properties or a low static coefficient of friction was imparted to the samples when they were subjected to boiling water for as little as three seconds. Still better improvement was obtained by inserting them into boiling water for 30 seconds. It should thus be apparent that the heat treatment process of the present invention achieves immediately high slip properties.

The articles as well as films produced according to the present invention can be utilized as X-ray film, photographic film, sheets, articles, and the like, whenever a high slip surface is desired to be immediately imparted to an unorientated polyester.

While certain representative embodiments and details have been shown for the purpose of illustrating the invention, it will be apparent to those skilled in the art that various changes and modifications can be made thereto without departing from the spirit and scope of the invention as defined in the appended claims hereinbelow.

What is claimed is:

1. A method for imparting high slip properties to a silicone modified unoriented polyester, comprising the steps of:

heating the silicone modified polyester at a temperature of from about 70° C. to about 200° C. so that a low static coefficient of friction is imparted thereto, wherein said silicone modified polyester was prepared by reacting a mixture of reactants comprising:

(a) at least one reactant selected from the group consisting of
(1) aromatic dicarboxylic acids having from 8 to 15 carbon atoms or $C_1$ to $C_4$ dialkyl esters thereof, and
(2) aliphatic dicarboxylic acids having from 4 to 15 carbon atoms or the $C_1$ to $C_4$ dialkyl esters thereof wherein the reactant selected from group (1) constitutes from 100 to 50 mole percent of the total moles of said reactant (a) and the reactant selected from the group (2) constitutes from 0 to 50 mole percent of the total moles of reactant (a);
(b) from about 100 to about 300 mole percent, based on the total moles of reactant (a) of at least one reactant selected from alkylene glycols containing from 2 to 10 carbon atoms; and
(c) from about 0.5 to about 10 weight percent based on the weight of the polymeric reaction product of a dihydroxy terminated polydimethylsiloxane block copolymer of the general formula

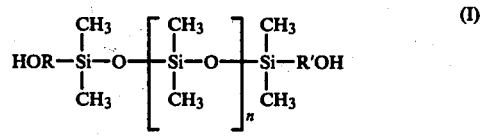

where n is an integer ranging from about 8 to about 15 and R and R' are divalent polymethylene oxide radicals corresponding to the general formula:

 (II)

and

 (III)

respectively, wherein x is an integer ranging from about 2 to about 8 and y is an integer ranging from about 8 to 15 and wherein the dihydroxy terminated polymethylsiloxane block copolymer has a molecular weight ranging from about 1,600 to 5,500.

2. A method according to claim 1, wherein said static coefficient of friction is 1.0 or less, wherein said silicone modified polyester is heated in a fluid which is inert to said polyester.

3. A method according to claim 2, wherein said temperature is from about 75° C. to about 105° C.

4. A method according to claim 3, wherein the amount of said silicone is from about 0.5 weight percent to about 6.5 weight percent, and wherein said static coefficient of friction is 0.5 or less.

5. A method according to claim 4, wherein said temperature is from about 80° C. to about 100° C., wherein said amount of silicone is from about 2 percent to about 6 weight percent, and wherein said coefficient of friction is 0.4 or less.

6. A method according to claim 5, wherein said fluid is water.

7. A method for imparting high slip properties of a silicone modified polyester, comprising:

making said silicone modified polymer by reaction of a mixture of reactants comprising:
- (a) at least one reactant selected from the group consisting of
  - (1) aromatic dicarboxylic acids having from 8 to 15 carbon atoms or $C_1$ to $C_4$ dialkyl esters thereof, and
  - (2) aliphatic dicarboxylic acids having from 4 to 15 carbon atoms or the $C_1$ to $C_4$ dialkyl esters thereof wherein the reactant selected from group (1) constitutes from 100 to 50 mole percent of the total moles of said reactant (a) and the reactant selected from the group (2) constitutes from 0 to 50 mole percent of the total moles of reactant (a);
- (b) from about 100 to about 300 mole percent, based on the total moles of reactant (a) of at least one reactant selected from alkylene glycols containing from 2 to 10 carbon atoms; and
- (c) from about 0.5 to about 10 weight percent based on the weight of the polymeric reaction product of a dihydroxy terminated polydimethylsiloxane block copolymer of the general formula $$HOR-\underset{\underset{CH_3}{|}}{\overset{\overset{CH_3}{|}}{Si}}-O\left[\underset{\underset{CH_3}{|}}{\overset{\overset{CH_3}{|}}{Si}}-O\right]_n\underset{\underset{CH_3}{|}}{\overset{\overset{CH_3}{|}}{Si}}-R'OH \quad (I)$$

where n is an integer ranging from about 8 to about 15 and R and R' are divalent polymethylene oxide radicals corresponding to the general formula:

$$(CH_2)_x O[(CH_2)_x O]_y (CH_2)_x \quad (II)$$

and $$(CH_2)_x O[(CH_2)_x]_y O(CH_2)_x \quad (III)$$

respectively, wherein x is an integer ranging from about 2 to about 8 and y is an integer ranging from about 8 to 15 and wherein dihydroxy terminated polymethylsiloxane block copolymer has a molecular weight ranging from about 1,600 to 5,500; and heating said silicone modified polyester at a temperature of from about 70° C. to about 200° C. to achieve said high slip.

8. A method according to claim 7, wherein reactant (a) is selected from the group consisting of terephthalic acid and dimethyl terephthalate, wherein reactant (b) is ethylene glycol, consisting essentially of the polymeric reaction product of the mixture of reactants (a), (b), and (c), wherein reactant (c) is the dihydroxy terminated polydimethylsiloxane block corresponding to the general formula (I) in which the integer n ranges from about 10 to about 13, the integer x of the divalent radicals R and R' therein corresponding to the formulae (II) and (III) is 2 and the integer y of the divalent radicals R and R' therein corresponding to the formulae (II) and (III) ranges from about 10 to about 13, wherein the molecular weight of reactant (c) ranges from about 1,900 to about 2,400.

9. A method according to claim 8, wherein the amount of said silicone is from about 0.5 to about 6.5 weight percent, and wherein said heating temperature is from about 75° C. to about 105° C.

10. A method according to claim 9, wherein the amount of said silicone is from about 2 percent to about 6 weight percent, and wherein said heating temperature is from about 80° C. to about 100° C.

11. A high slip silicone modified, unorientated polyester article, comprising:

a silicone modified polyester which was prepared by reacting a mixture of reactants comprising:
- (a) at least one reactant selected from the group consisting of
  - (1) aromatic dicarboxylic acids having from 8 to 15 carbon atoms or $C_1$ to $C_4$ dialkyl esters thereof, and
  - (2) aliphatic dicarboxylic acids having from 4 to 15 carbon atoms or the $C_1$ to $C_4$ dialkyl esters thereof wherein the reactant selected from group (1) constitutes from 100 to 50 mole percent of the total moles of said reactant (a) and the reactant selected from the group (2) constitutes from 0 to 50 mole percent of the total moles of reactant (a);
- (b) from about 100 to about 300 mole percent, based on the total moles of reactant (a) of at least one reactant selected from alkylene glycols containing from 2 to 10 carbon atoms; and
- (c) from about 0.5 to about 10 weight percent based on the weight of the polymeric reaction product of a dihydroxy terminated polydimethylsiloxane block copolymer of the general formula $$HOR-\underset{\underset{CH_3}{|}}{\overset{\overset{CH_3}{|}}{Si}}-O\left[\underset{\underset{CH_3}{|}}{\overset{\overset{CH_3}{|}}{Si}}-O\right]_n\underset{\underset{CH_3}{|}}{\overset{\overset{CH_3}{|}}{Si}}-R'OH \quad (I)$$

where n is an integer ranging from about 8 to about 15 and R and R' are divalent polymethylene oxide radicals corresponding to the general formula:

$$(CH_2)_x O[(CH_2)_x O]_y (CH_2)_x$$

and $$(CH_2)_x O[(CH_2)_x]_y O(CH_2)_x \quad (III)$$

respectively, wherein x is an integer ranging from about 2 to about 8 and y is an integer ranging from about 8 to 15 and wherein the dihydroxy terminated polymethylsiloxane block copolymer has a molecular weight ranging from about 1,600 to 5,500; said polyester article having been heated at a temperature of from about 70° C. to about 200° C. whereby said high slip is immediately imparted to said silicone polyester article.

12. A high slip silicone modified polyester article according to claim 11, including immediately heating said polyester article after said article has been formed.

13. A high slip silicone modified polyester article according to claim 11, wherein said article has a static coefficient of friction of 1.0 or less.

14. A high slip silicone modified polyester article according to claim 13, wherein said polyester is heated in an inert fluid.

15. A high slip silicone modified polyester article according to claim 14, wherein said heating temperature is from about 75° C. to about 105° C., and wherein the amount of said silicone is from about 0.5 to about 6.5 weight percent.

16. A high slip silicone modified polyester article according to claim 15, wherein said coefficient of friction is 0.5 or less.

17. A high slip silicone modified polyester article according to claim 16, wherein said heating temperature is from about 80° C. to about 100° C., and wherein the amount of said silicone is from about 2 to about 6 weight percent.

18. A high slip silicone modified polyester article according to claim 17, wherein said static coefficient of friction is 0.4 or less.

19. A high slip silicone modified polyester article according to claim 18, wherein fluid is water.

20. A high slip silicone modified polyester article according to claim 19, including immediately heating said polyester article after said article has been formed.

* * * * *